Nov. 8, 1938.　　　　　　A. NAGEL　　　　　　2,135,989

COMBINED CAMERA AND RANGE FINDER

Filed May 1, 1937

*August Nagel*
INVENTOR.

BY

ATTORNEYS

Patented Nov. 8, 1938

2,135,989

UNITED STATES PATENT OFFICE 2,135,989

COMBINED CAMERA AND RANGE FINDER

August Nagel, Stuttgart, Germany, assignor to Eastman Kodak Company, Rochester, N. Y., a corporation of New Jersey Application May 1, 1937, Serial No. 140,235
In Germany September 2, 1936

4 Claims. (Cl. 95—44)

This invention relates to photographic cameras having range finders coupled therewith. It relates particularly to the means of coupling the range finder light deviating means to the camera focusing adjuster.

It is an object of the invention to provide a means whereby the setting of a base-type range finder will be accurately controlled by the position of the camera focus adjusting means. It is a particular object of the invention to provide such a means which has a simple construction and which is adapted for use with a camera focusing means of the sliding bed type. Another object is to provide a device of the class described which is suitable for use in compact folding cameras in which there is but little room available for range finder mechanism. Other objects and advantages of the invention will be apparent from the following description when read in connection with the accompanying drawing in which like reference numerals denote like parts throughout and in which:

Figure 1:
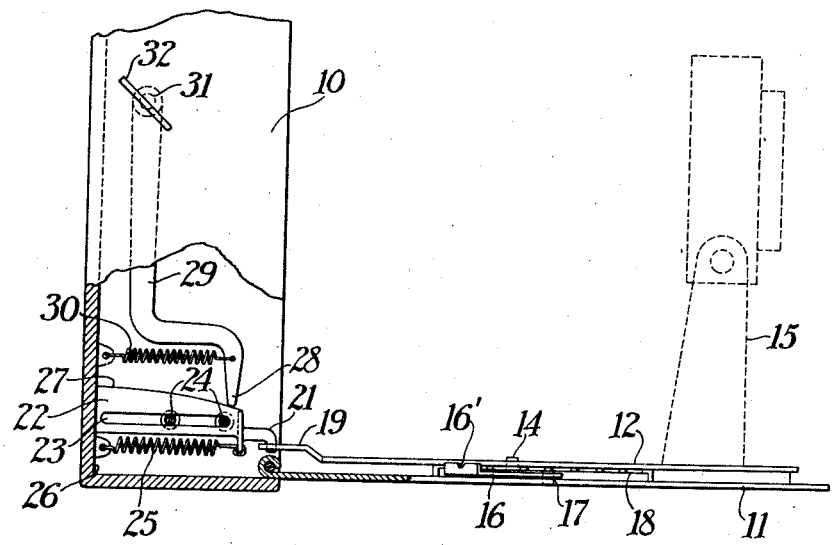
Fig. 1 is an elevation partly broken away of a camera whose structure includes one embodiment of the invention.
Figure 2:
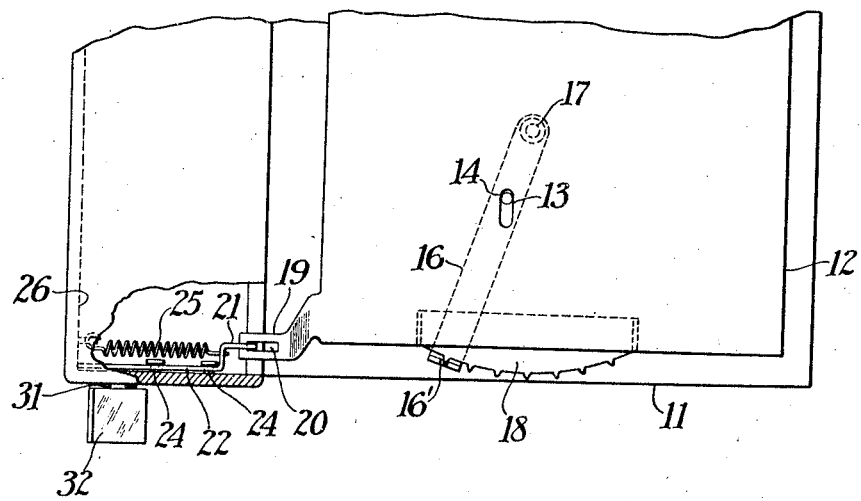
Fig. 2 is a plan of the arrangement shown in Fig. 1.

In Fig. 1 a camera of the folding bed type has a housing 10 and a bed 11 upon which a sliding bed plate 12 rests. The bed plate 12 carries a lens mount 15 in the usual manner and is adjustable by any of the well-known means such as a rack and pinion, screw threaded or, as shown, a transverse lever system including a lever 16 pivotally secured to the bed 11 at the point 17 and carrying a projection 14 which projects through a slot 13 in the sliding plate 12. Rotation of the lever 16 about the point 17 thus causes the sliding plate 12 to move forward in the well-known manner. The amount of rotation and, hence, the image distance for which the camera is focused is indicated by a scale 18, near the outer end of the lever 16. The scale 18 carries projections onto which a notch 16' on the lever 16 is urged by an inherent resilience in the lever 16 in a known manner.

On the inner end of the bed plate 12 is a projection 19 having a slot 20 therein which engages a hook 21 when the camera is in the operative position as shown. This hook 21 is rigidly attached to a plate 22 which is slidably secured to the inside wall of the camera housing 10 by means of slot 23 and pins 24. The plate 22 is urged toward the back of the camera and, hence, the hook 21 is urged into engagement with the inner end of the slot 20, by means of a spring 25. One part 26 of the camera housing 10 or the pins 24 define the innermost limit of movement of the plate 22.

The upper edge of the plate 22 presents a cam shaped surface 27, into engagement with which the end 28 of a lever 29 pivoted at the point 31 is urged by a spring 30. The shaft 31 which rotates with the lever 29 supports the light deviating means of a range finder. This light deviating means may be a simple reflector 32 as shown or it may be any of the suitable well-known types such as a rotating wedge or prism.

The camera focusing adjustment may be of any suitable sliding bed type. This sliding bed may be coupled to the plate 22 in any suitable manner which permits the camera bed 11 to be folded in the well-known way. In the preferable form of the invention, the spring 25 urges the plate 22 toward the rear of the camera as shown since this permits very simple coupling in the form of a hook 21 and a slot 20. The hook 21 may be pivotally attached to the plate 22 if said hook is extended so that it will not become disengaged from the slot 20 when the camera is closed. That is, instead of being a rigid part of plate 22, the hook 21 may be attached to this plate by a pivot, if the hook is made long enough and is bent far enough around so that it will not accidentally let go of the slot 20.

The spring 30 urging the end 28 of the lever 29 into engagement with the cam 27 and the spring 25 urging the hook 20 into close engagement with the end of the slot 20 practically eliminate any backlash in the range finder camera focuser coupling arrangement. Thus, the invention provides an accurate range finder coupling means which is simple and convenient to manufacture.

Only one embodiment of the invention has been shown in the drawing. However, it is to be understood that the invention is not limited to the specific structure shown but is of the scope of the appended claims.

What I claim and wish to protect by Letters Patent of the United States is:

1. In combination with a camera of the folding bed type and having a housing, a lens, a sliding member mounted on the camera bed and supporting said lens, means for adjusting the position of said sliding member relative to the camera bed for focusing the camera, a cam slidably mounted in the camera housing and having a curved cam surface whose active surface is longer than two thirds of the total movement of said sliding member throughout the focusing range, means connecting the cam to the sliding member for moving the former by, and a distance equal to, the motion of the latter, a cam follower engaging said active surface to be moved thereby a distance less than the motion of the cam as determined by the curve of the active surface, resilient means mounted on the camera housing for urging the cam in one direction of its sliding motion, a range finder light deviating means mounted on the camera housing and means engaging said light deviating means and said cam follower for adjusting the former whereby the adjustment of the light deviating means is controlled by the position of the cam in accordance with the curve of its active surface.

2. In combination with a camera having a housing and a folding bed, a lens, a lens support slidably mounted on the camera bed, means for adjusting said lens support to vary the camera focus, a cam member slidably secured to an inner wall of the camera housing to move parallel to the optic axis of the camera and having a curved active surface whose length is greater than two thirds of the distance moved by the lens support throughout the focusing range of the camera, means urging said member toward the rear of said housing, a cam follower engaging and movable along said active surface to be moved thereby, a range finder light deviating means mounted on said housing, means coupling said range finder light deviating means to the cam follower and means coupling in unit ratio the cam member to the lens support, whereby motion of the lens support to focus the camera is transmitted undiminished to the cam member and in a predetermined manner to the range finder light deviating means.

3. In combination with a camera having a housing, a bed plate hingedly attached to the housing, a lens, a mount supporting said lens and secured in a slidable manner for focusing purposes to the camera bed, a member slidably secured to the inside of the camera housing and having a curved cam surface whose active length is greater than two thirds of the motion of the lens mount throughout the focusing range of the camera, a lever the end of which engages the active portion of said surface to be moved thereby, a range finder light deviating means mounted on the camera housing and adapted to be adjusted by rotation of said lever, and means coupling the lens mount to the cam member for moving the latter by, and a distance about equal to, the motion of the former, whereby adjustment of the range finder light deviating means is provided when the lens mount is moved for focusing purposes.

4. In combination with a camera having a housing, a bed plate hingedly attached thereto, a lens, a mount for the lens carried by the bed plate in a slidable manner for focusing, a member slidably secured to the inside of the camera housing and having a curved cam surface whose active length is greater than two thirds of the motion of the lens mount throughout its focusing range, a cam follower movable by said surface and engaging said surface at a point which moves along the surface by amounts greater than two thirds of the motion of the cam when the cam is moved, a range finder light deviating means mounted on the camera housing and coupled to said cam follower whereby adjustment of the light deviating means is obtained by moving said slidable member and means connecting this slidable member to the lens mount, said connecting means including at least two relatively movable and disengageable parts adapted to permit the bed plate to fold and to provide a definite grip when the lens mount is in operative position for focusing.

AUGUST NAGEL.